United States Patent [19]

Yatsu et al.

[11] Patent Number: 4,622,268

[45] Date of Patent: Nov. 11, 1986

[54] FIVE-COMPONENT COPOLYESTER, PROCESS FOR PREPARATION THEREOF, AND SHAPED ARTICLES THEREOF

[75] Inventors: Tadao Yatsu, Iwakuni; Takayuki Nakano, Ohtake; Nobuya Hinooka; Tatsuo Kato, both of Iwakuni, all of Japan

[73] Assignee: Mitsui Petrochemical Industries, Ltd., Tokyo, Japan

[21] Appl. No.: 675,189

[22] Filed: Nov. 27, 1984

[30] Foreign Application Priority Data

Nov. 28, 1983 [JP]  Japan .............................. 58-222182

[51] Int. Cl.⁴ ..................... B32B 27/08; B32B 27/36
[52] U.S. Cl. .................................... 428/480; 528/272
[58] Field of Search ....................... 528/272; 428/480

[56] References Cited

U.S. PATENT DOCUMENTS 4,403,090  9/1983  Smith ................................ 528/272

OTHER PUBLICATIONS

Journal of Polymer Science, vol. XV, No. 80, 1955, pp. 591–592.

*Primary Examiner*—Thomas J. Herbert
*Attorney, Agent, or Firm*—Sherman and Shalloway

[57]  ABSTRACT

A five-component copolyester not described in the prior art literature which comprises at least five components, i.e. (a) two aromatic dicarboxylic acid components composed of a major amount of an isophthalic acid component and a minor amount of another dicarboxylic acid component, (b) a diol component composed of an ethylene glycol component and optionally another diol component, (c) an aromatic monohydroxymonocarboxylic acid component and (d) a polyfunctional compound component having at least three functional groups. The copolyester has excellent melt moldability, mechanical strength, transparency and gas-barrier property in a well balanced combination, and shows improved properties over conventional copolyesters containing a major amount of isophthalic acid as a dicarboxylic acid component.

6 Claims, No Drawings

FIVE-COMPONENT COPOLYESTER, PROCESS FOR PREPARATION THEREOF, AND SHAPED ARTICLES THEREOF

This invention relates to a five-component copolyester not described in the prior art literature which comprises at least five components, i.e. two aromatic dicarboxylic acid components composed of a major amount of an isophthalic acid component and a minor amount of another dicarboxylic acid component, a diol component composed of an ethylene glycol component and optionally another diol component, an aromatic monohydroxy-monocarboxylic acid component and a polyfunctional compound component having at least three functional groups, a process for production thereof, and a shaped article prepared therefrom.

The five-component copolyester comprising a major amount of isophthalic acid as a dicarboxylic acid component has excellent melt moldability, mechanical strength, transparency and gas-barrier property in a well balanced combination, and shows improved properties over conventional copolyesters containing a major amount of isophthalic acid as a dicarboxylic acid component. It is useful, for example, in such applications as containers and packaging materials.

More specifically, the present invention relates to a five-component copolyester composed of the following components (a) to (d) and having the following characteristics (e) and (f):

(a) 25 to 45 mole %, based on the total moles of the components (a), (b), (c) and (d) of the copolyester, of two aromatic dicarboxylic acid components composed of 70 to 90 mole % of an isophthalic acid component and 30 to 10 mole % of an aromatic dicarboxylic acid component other than the isophthalic acid component, each based on the total moles of the two aromatic dicarboxylic acid components, (b) 45 to 50 mole %, based on the total moles of the components (a), (b), (c) and (d) of the copolyester, of a diol component composed of 50 to 100 mole % of an ethylene glycol component and 0 to 50 mole % of a diol component other than the ethylene glycol component, each based on the total moles of the two diol components, (c) 2 to 25 mole %, based on the total moles of the components (a), (b), (c) and (d) of the copolyester, of an aromatic monohydroxy-monocarboxylic acid component having 7 to 12 carbon atoms, and (d) 0.01 to 2 mole %, based on the total moles of the components (a), (b), (c) and (d) of the copolyester, of a polyfunctional compound component having 3 to 15 carbon atoms and at least three functional groups selected from the class consisting of carboxyl and hydroxyl groups; and (e) an intrinsic viscosity $[\eta]$, determined at 25° C. in a mixed solvent of phenol and tetrachloroethane in a weight ratio of 1:1, of 0.5 to 1.5 dl/g, and (f) a glass transition temperature of 50° to 120° C.

The present invention also pertains to shaped articles in various shapes such as films, sheets, plates, fibers, containers and other articles composed of the five-component copolyester, and particularly, to a stretched or unstretched laminated structure. for example in the form of a blow-molded article such as a container, consisting of a layer of the five-component copolyester of the invention and a layer of poly(ethylene terephthalate) or a copolymer having ethylene terephthalate as a major structural unit.

Previously, glass has been widely used as a material for containers holding seasonings, oils, beer, wines and liquors, cooling beverages such as carbonated beverages, cosmetics, detergents, etc. Glass containers have excellent gas barrier properties, but because of the high cost of production, it is the usual practice to recover and reuse empty containers after use. The glass containers are heavy and require large transporting expenses. Moreover, they have the defect of susceptibility to breakage and inconvenient handling.

To remove the aforesaid defects of the glass containers, increasing efforts have been made to replace them by plastic containers, and various plastic materials have been used according to the types and the purposes for which articles to be held by such containers are used. Particularly, poly(ethylene terephthalate) has been extensively used as a material for containers holding seasonings, cooling beverages, detergents, cosmetics, etc. because of its superior gas-barrier property and transparency. In the case of containers for holding beer or carbonated beverages which most rigorously require gas-barrier properties, however, poly(ethylene terephthalate) has not proved to be entirely satisfactory. To produce containers for these articles from poly(ethylene terephthalate), it has been necessary to increase gas-barrier property by increasing the wall thickness of the containers. There has been an increasing demand for polyester containers, but to increase their use in these applications, it has been strongly desired to develop polyesters having excellent gas-barrier property and melt-moldability.

Various polyesters have been used which are composed, for example, of terephthalic acid, isophthalic acid or a reactive derivative thereof such as an ester thereof, as an aromatic dicarboxylic acid component and ethylene glycol or another alkylene glycol as a diol component, and among them, poly(ethylene terephthalate) has been most widely utilized. Copolyesters having a third component have also been known. Such a third component includes, for example, aromatic hydroxycarboxylic acids such as monohydroxy-monocarboxylic acids and polyfunctional compounds having at least three functional groups such as carboxyl and hydroxyl groups. Usually, however, no satisfactory improving effect is obtained by the inclusion of the third component. For example, modified poly(ethylene terephthalate) obtained by co-condensing an aromatic hydroxycarboxylic acid unit as a third component has excellent stretchability, but a biaxially stretched container molded from the modified poly(ethylene terephthalate) does not prove to have sufficient gas-barrier property.

Improved polyesters or polyester ethers prepared by co-condensing an aromatic dicarboxylic acid component such as terephthalic acid or isophthalic acid as a third component with polyesters comprising an aromatic hydroxycarboxylic acid component such as p-hydroxybenzoic acid or polyesters or polyester ethers comprising the aforesaid aromatic hydroxycarboxylic acid component and an alkylene glycol component such as ethylene glycol are excellent molding materials, However, these modified polyesters or polyester ethers do not have sufficient biaxial stretchability, and moreover, biaxially stretched containers obtained from these materials do not have sufficient gas-barrier property.

Japanese Patent Publication No. 7496/1963, a publication issued before the priority date of the present application, discloses a process for producing a cocondensed polyether ester, which comprises polycondensing p-hydroxybenzoic acid or its alkyl ester, isophthalic acid or its alkyl ester, and an alkylene glycol of the general formula HO(CH$_2$)$_n$OH wherein n is a positive integer of from 2 to 6 under heat in the presence of a catalyst. The patent document describes that for example, copolyisophthalate useful as a heat shrinkable packaging material is obtained by this process.

U.S. Pat. No. 4,403,090 known before the priority date of the present application discloses poly(ethylene isophthalate) and copolymers thereof having low glass transition temperatures, and states that they have very good barrier properties.

These patent documents, however, totally fail to describe or suggest the five-component copolyester of the invention composed of the components (a) to (d) and having the characteristics (e) and (f).

The present inventors recognized the aforesaid state of the art relating to molded articles of polyesters or polyester ethers, particularly stretched blow-molded containers of these materials, and extensively worked on the development of a polyester having excellent melt moldability, stretching moldability and gas-barrier property and exhibiting excellent performance when molded into a stretched blow-molded container. These research efforts have led to the discovery that a co-condensed polyester composed of the aforesaid components (a) to (d) and having the characteristics (e) and (f) is a polymer not described in the prior literature, and can give a stretched molded article, particularly a stretched, multilayer blow-molded article, which has the aforesaid excellent properties. It has also been found that a laminated article composed of a layer of the novel cocondensed polyester and a layer of a poly(alkylene terephthalate) comprising ethylene terephthlate as a main structural unit, a stretched molded article thereof, a preform having the aforesaid laminated structure for multilayer blow-molded articles, and a stretched multilayer blow-molded article prepared from the preform have excellent melt-moldability, mechanical strength, transparency and gas-barrier property, and, therefore, such a laminated structure is an excellent material for the production of multilayer blow-molded articles, particularly stretched blow-molded containers.

It is an object of this invention therefore to provide a five-component copolyester not described in the prior literature.

Another object of this invention is to provide a process for producing the aforesaid five-component copolyester and the use thereof.

The above and other objecs and advantages of this invention will become more apparent from the following description.

The five-component copolyester of this invention is composed of the five components (a) to (d) mentioned above. The polymer molecular chain of this copolyester is formed by ester linkages formed by the condensation of the adjoining carboxyl and hydroxyl groups of the individual components and ether linkages formed by the condensation of the phenolic hydroxyl group and the hydroxyl group of the diol component which adjoin each other. Any of these components may be disposed at the molecular ends of the copolyester. The carboxyl group at the end of the molecule may be esterified with another alcohol, and the hydroxyl group at the end of the molecule may be esterified with another lower carboxylic acid. Alternatively, the hydroxyl group at the end of the molecule may be etherified with another alcohol. A minor portion (for example, not more than 10 mole %) of the diol component (b) having a major proportion of ethylene glycol may form a diol component unit having an ether linkage by reaction with another diol such as diethylene glycol.

The copolyester of this invention has a substantially linear structure. The substantially linear structure means a chain structure having branched chains and being substantially free from a gelled crosslinked structure (network structure). This is confirmed by the fact that the copolyester of the invention is completely soluble in a mixed solvent of phenol and tetrachloroethane in a weight ratio of 1:1.

The five-component copolyester of the invention is composed of:

(a) 25 to 45 mole %, based on the total moles of the components (a), (b), (c) and (d) of the copolyester, of two aromatic dicarboxylic acid components composed of 70 to 90 mole % of an isophthalic acid component and 30 to 10 mole % of an aromatic dicarboxylic acid component other than the isophthalic acid component, each based on the total moles of the two aromatic dicarboxylic acid components, (b) 45 to 50 mole %, based on the total moles of the components (a), (b), (c) and (d) of the copolyester, of a diol component composed of 50 to 100 mole % of an ethylene glycol component and 0 to 50 mole % of a diol component other than the ethylene glycol component, each based on the total moles of the two diol components, (c) 2 to 25 mole %, based on the total moles of the components (a), (b), (c) and (d) of the copolyester, of an aromatic monohydroxy-monocarboxylic acid component having 7 to 12 carbon atoms, and (d) 0.01 to 2 mole %, based on the total moles of the components (a), (b), (c) and (d) of the copolyester, of a polyfunctional compound component having 3 to 15 carbon atoms and at least three functional groups selected from the class consisting of carboxyl and hydroxyl groups.

If the proportion of the aromatic dicarboxylic acid components (a) is less than 25 mole %, and the proportion of the aromatic hydroxycarboxylic acid component is larger than 25 mole %, long periods of time are required for the esterifiction, etherification and polycondensation reaction during the production of the copolyester, and the copolyester and its stretched articles have reduced gas-barrier properties. Hence, such proportions of the components (a) and (c) are undesirable in respect of both productivity and performance.

If the proportion of the aromatic dicarboxylic acid components (a) is larger than 45 mole % and the proportion of the aromatic hydroxycarboxylic acid component (c) is less than 2 mole %, a cyclic oligomer of isophthalic acid and ethylene glycol forms during polycondensation in the production of the copolyester as already reported in Journal of Polymer Science, Vol. XV, pages 591–592 (1955). The formation of the cyclic oligomer reduces the yield of the final polymer and also the oligomer deposits on unheated portions of the polymerization apparatus and solidifies. This is undesirable from the standpoint of productivity. Furthermore, the oligomer is likely to be included in the copolyester to be recovered after the polycondensation, and may possibly cause a quality problem. To avoid it, a special contrivance is required in the apparatus, and this is economically disadvantageous.

The polyfunctional compound component (d) serves to shorten the polymerization time and improve the melt flowability of the resulting copolyester. If its proportion exceeds 2 mole %, the final copolyester contains a large amount of a gelled structure and fails to be substantially linear. This results in reduced melt moldability.

The copolyester of this invention should have an intrinsic viscosity, as determined at 25° C. in a mixed solvent of phenol and tetrachloroethane in a weight ratio of 1:1, of from 0.5 to 1.5 dl/g, preferably from 0.6 to 1.2 dl/g, and a glass transition point in the range of from 50° to 120° C., preferably from 55° to 100° C. If the intrinsic viscosity of the copolyester is larger than 1.5 dl/g, its melt moldability and also stretchability are reduced. If it is less than 0.5 dl/g, the copolyester and stretched articles thereof have reduced mechanical strength. If the glass transition temperature of the copolyester is lower than 50° C., drying of the copolyester which is required to reduce a decrease in molecular weight during its melt molding is difficult to carry out economically.

The aromatic dicarboxylic acid components (a) constituting the copolyester of this invention are composed mainly of an isophthalic acid component. The proportion of the isophthalic acid component is usually 70 to 90 mole % based on the total amount in moles of the aromatic dicarboxylic acid components. Other aromatic dicarboxyilc acid components than the isophthalic acid component include, for example, aromatic dicarboxylic acids having 8 to 12 carbon atoms such as terephthalic acid, phthalic acid and 2,5-naphthalenedicarboxylic acid.

The diol component (b) constituting the copolyester of this invention is composed mainly of an ethylene glycol component. The proportion of the ethylene glycol component is usually 50 to 100 mole %, preferably 70 to 100 mole %, based on the total amount in moles of the diol components. Other diol components than ethylene glycol include, for example, diols having 3 to 15 carbon atoms such as 1,3-propanediol, 1,4-butanediol, neopentyl glycol, cyclohexanediol, cyclohexanedimethanol, 1,4-bis(beta-hydroxyethoxy)benzene, 1,3-bis(-beta-hydroxyethoxy)benzene, 2,2-bis(4-beta-hydroxyethoxyphenyl)propane and bis(4-beta-hydroxyethoxyphenyl)sulfone.

The aromatic hydroxycarboxylic acid component constituting the copolyester of this invention is an aromatic monohydroxy-monocarboxylic acid component having 7 to 12 carbon atoms. Specific examples include salicylic acid, 4-methylsalicylic acid, 3-hydroxybenzoic acid, 4hydroxybenzoic acid, 3-methyl-4-hydroxybenzoic acid, 4-hydroxy-1-naphthoic acid and 6-methyl-4-hydroxy-1-naphthoic acid. They may be used as a mixture of two or more.

The polyfunctional compound component (d) constituting the copolyester of this invention is a trifunctional or higher polyfunctional compound component having 3 to 15 carbon atoms and at least 3 carboxyl or hydroxyl groups. Specific examples of the polyfunctional compound component include aromatic polybasic acids such as trimellitic acid, trimesic acid and 3,3',5,5'-tetracarboxydiphenyl, aliphatic polybasic acids such as butanetetracarboxylic acid, aromatic polyols such as phloroglycine and 1,2,4,5-tetrahydroxybenzene, aliphatic polyols such as glycerol, trimethylolethane, trimethylolpropane and pentaerythritol, and hydroxypolycarboxylic acids such as tartaric acid and malic acid.

The copolyester of this invention can be produced by known conventional methods used in the production of poly(ethylene terephthalate). According to this invention, there is provided a process for producing a copolyester, which comprises subjecting a mixture composed of (i) an aromatic dicarboxylic acid component composed of a major proportion of isophthalic acid component or an ester thereof and a minor proportion of an aromatic dicarboxylic acid other than isophthalic acid,
(ii) a diol component composed of a major proportion of ethylene glycol which may further contain a diol other than ethylene glycol,
(iii) an aromatic monohydroxy-monocarboxylic acid having 7 to 12 carbon atoms or an ester or ether thereof, and
(iv) a polyfunctional compound having 3 to 15 carbon atoms and at least three functional groups selected from the class consisting of carboxyl and hydroxyl groups, or an ester or ether thereof, to esterification, etherification or transesterification at a temperature of 200° to 260° C., and subsequently copoly-condensing the reaction mixture at a temperature of 230° to 280° C. in the presence of a catalyst composed of an antimony compound, a germanium compound or a titanium compound and a phosphorus compound to form a five-component copolyester composed of the components (a) to (d) described above and having the aforesaid characteristics (e) and (f).

The aromatic dicarboxylic acid component may be fed to the reaction system as the aromatic dicarboxylic acid or its dialkyl ester, or also as its ester with a diol, for example as its bis-beta-hydroxyethyl ester.

The diol component may be fed as a diol or a diol ester of the carboxylic acid component.

The aromatic hydroxy-monocarboxylic acid component may be fed as the aromatic hydroxy-monocarboxylic acid, or its alkyl ester or also as its diol ester.

The copolycondensation may be catalyzed by a catalyst composed of antimony, germanium, titanium or a compound of such an element and a phosphorus compound. The compound of antimony, germanium or titanium may, for example, be the oxide, hydroxide, halide, inorganic acid salt, organic acid salt, complex salt, double salt, alcoholate or phenolate. These catalysts may be used singly or as a mixture of two or more. The proportion of the metal or its compound constituting the catalyst is, for example, $10^{-5}$ to $10^{-2}$ gram-atom, preferably $5\times10^{-5}$ to $5\times10^{-3}$ gram atoms, per mole of the aromatic dicarboxylic acids and the aromatic hydroxy-monocarboxylic acid combined. Examples of the phosphorus compound are phosphoric acid, phosphorous acid, hypophsphorous acid, polyphosphoric acid, and various esters, phosphines and phosphites of these acids. The proportion of the phosphorus acid used is, for example, $10^{-5}$ to $10^{-2}$, preferably $2\times10^{-5}$ to $5\times10^{-3}$ gram-atom, per mole of the aromatic dicarboxylic acids and the aromatic hydroxy-monocarboxylic acid combined. The catalyst may be fed to the reaction system in the initial stage of esterification or transesterification, or before the stage of the copolycondensation begins.

During the copolycondensation, various additives such as catalysts for transesterification used in the production of poly(ethylene terephthalate), an agent for inhibiting the formation of diethylene glycol, a heat stabilizer, a light stabilizer, a lubricant, a pigment and a dye may be used.

Metal compounds such as compounds of calcium, magnesium, lithium, zinc, cobalt and manganese can be used as the transesterification catalysts. These compounds may be in the form of oxides, hydroxides, halides, inorganic acid salts, organic acid salts, etc. Examples of the inhibitor for the formation of diethylene glycol are amines such as triethylamine and tri-n-butylamine, and quaternary ammonium compounds such as tetraethyl ammonium hydroxide and tetrabutyl ammonium hydoxide. Phosphorus compounds such as phosphoric acid, phosphorous acid, hypophosphorous acid, and their esters may be used as the heat stabilizers.

The copolyester of this invention can be produced by using a known melt-polycondensation method, or in some cases, by employing a solid-phase polycondensation method after the melt-polycondensation. A so-called direct polycondensation method may be employed in such a melt-polymerization process. Or a so-called transesterification-polycondensation method may also be used.

For example, the melt-polycondensation method comprises subjecting isophthalic acid or an aromatic dicarboxylic acid comprising isophthalic acid as a main component or an ester thereof, ethylene glycol or a diol comprising ethylene glycol as a main component, an aromatic monohydroxy-monocarboxylic acid or a condensation product thereof with a dicarboxylic acid, and a polyfunctional compound containing at least three carboxyl or hydroxyl groups either simultaneously or consecutively to esterification and etherification or transesterification at a temperature of 100° to 280° C. to form an initial stage condensate, and polycondensing the condensate under vacuum or in an inert gas at a temperature above the melting point of the condensate, preferably at 200° to 300° C. with stirring.

The copolyester of the invention may also be produced by subjecting the polyester obtained by the above melt-polycondensation method further to solid-phase polycondensation to increase its molecular weight. Specifically, the solid-phase polycondensation method may comprise converting the polyester obtained by the melt-polycondensation method into fine particles, and maintaining the particles at a temperature below the melting point of the polyester, preferably at 180° to 240° C., under vacuum or in an inert gas.

The copolyester of this invention may be used in the unstretched state as a material for molding into films, sheets, fibers, containers or other shapes by usual molding methods. When the copolyester of the invention is molded in the stretched state into films, sheets and containers, the resulting molded articles have better gas-barrier property.

Now, stretched articles of the copolyester of this invention will be described. These stretched articles include monoaxially stretched articles and biaxially stretched articles which may be in the form of films, sheets or fibers. In the case of monoaxial stretching, the stretch ratio is usually from 1.1 to 10, preferably 1.2 to 8, especially preferably 1.5 to 7. For biaxial stretching, the stretch ratio is usually 1. to 8, preferably 1.2 to 7, especially preferably 1.5 to 6, in the longitudinal direction, and usually 1.1 to 8, preferably 1.2 to 7, especially preferably 1.5 to 6, in the transverse direction. Depending upon the purpose of use, the stretched articles may be heat-set.

As required, the stretched articles of the copolyester of the invention may contain suitable amounts of various additives used in conventional polyesters, such as nucleating agents, inorganic fillers, lubricants, slip agents, antiblocking agents, stabilizers, antistatic agents, antihaze agents and pigments.

Any of the conventional known methods can be used to produce stretched articles from the copolyester of this invention. Generally, a molded article, such as a film or sheet, molded from the copolyester or a composition composed of it and optional additives is stretched at a temperature ranging from its glass transition point to its melting point, preferably from its glass transition point to a temperature 80° C. higher than the glass transition point, either as such or after it has been cooled to a temperature below its glass transition temperature and then re-heated. Heat-setting of the stretched product may be carried out for a short period of time at the aforesaid stretching temperature or a temperature higher than it.

The stretched article of the copolyester of this invention may be produced by various methods. For example, when the pre-molded article is a film or sheet, the stretched article may be produced by a method in which it is stretched monoaxially (monoaxial stretching), a method in which it is stretched in the machine direction and then in the transverse direction (biaxial stretching), a method in which it is stretched simultaneously in the machine direction and the transverse direction (biaxial stretching), a method in which it is biaxially streteched and then further stretched in one of the two directions, a method in which it is stretched biaxially and then further stretched in the two directions, and a so-called vacuum forming method in which the space between the film or sheet and a mold is maintained under reduced pressure thereby stretching the film or sheet. The stretched article of the copolyester may also be produced in a form laminated with another resin, for example by a method for producing such a laminated structure comprises laminating at least one layer of the pre-molded article such as a film or sheet to at least one layer of a premolded article of another resin such as a film or sheet, and then stretching the resulting laminate, or a method which comprises bonding a film or sheet of another resin to a stretched article of the copolyester.

A laminated structure in the stretched or unstretched state composed of a layer of the five-component copolyester of the invention and a layer of poly(ethylene terephthalate) or a copolyester thereof containing ethylene terephthalate as a main structural unit will be described below.

Examples of such a laminated structure include a two-layer laminate composed of the copolyester layer and the poly(alkylene terephthalate) layer, a three-layer laminate composed of two outside layers of the poly(alkylene terephthalate) and an interlayer of the copolyester, a three-layer laminate composed of two outside layers of the copolyester and an interlayer of the poly(alkylene terephthalate), a multilayer laminate composed of four or more layers prepared by laminating the copolyester layers and the poly(alkylene terephthalate) layers alternately with two outermost layers being composed of the poly(alkylene terephthalate), a multilayer laminate composed of four or more layers prepared by laminating the copolyester layers and the poly(alkylene terephthalate) layers alternately with two outermost layers being composed of the copolyester, and a multilayer laminate composed of four or more layers prepared by laminating the copolyester layers and the poly(alkylene terephthalate) layers alternately and having one outermost layer composed of the copolyester and the other outermost layer composed of the poly(alkylene terephthalate). The laminates may be applied not only to sheet-like articles, plate-like articles and tubular articles, but also to various hollow articles, containers and structures of various shapes. The laminates can be produced by known conventional methods.

The thicknesses of the copolyester layer and the poly(alkylene terephthalate) layer constituting the laminate may be properly determined depending upon the end use of the laminate, and is not particularly limited. When the laminate is the aforesaid two-layer laminate, the thickness of the copolyester layer is usually 4 to 350 microns, preferably 6 to 200 microns, and the thickness of the poly(alkylene terephthalate) layer is usually 8 to 600 microns, preferably 10 to 500 microns. When the laminate is the first-mentioned three-layer laminate, the thickness of the interlayer of the copolyester is usally 4 to 350 microns, preferably 6 to 200 microns, and the thickness of each outside layer of the poly(alkylene terephthalate) layer is usually 4 to 300 microns, preferably 5 to 250 microns. When the laminate is the latter-mentioned three-layer laminate, the thickness of the interlayer of the poly(alkylene terephthalate) is usually 8 to 600 microns, preferably 10 to 500 microns, and the thickness of each outside layer of the copolyester is usually 4 to 100 microns, preferably 6 to 50 microns. In the case of the multilayer laminates composed of four or more layers, the thickness of the interlayer or outside layer of the copolyester and the thickness of the interlayer or outside layer of the poly(alkylene terephthalate) may be selected in the same manner as above.

The poly(alkylene terephthalate) constituting the aforesaid laminate is a polyester containing ethylene terephthalate as a main structural unit. The proportion of the ethylene terephthalate recurring unit is usually at least 50 mole %, preferably at least 70 mole %. The dicarboxylic acid unit constituting the poly(alkylene terephthalate) may contain a small amount of another aromatic dicarboxylic acid component in addition to the terephthalic acid unit. Specific examples of the other aromatic dicarboxylic acid component are isophthalic acid, phthalic acid and naphthalenedicarboxylic acid. The diol component constituting the poly(alkylene terephthalate) may contain a small amount of another diol unit. Specific examples of the other diol unit are units of diols having 3 to 15 carbon atoms, such as 1,3-propanediol, 1,4-butanediol, neopentyl glycol, cyclohexanediol, cyclohexanedimethanol, 1,4-bis(beta-hydroxyethoxy)benzene, 1,3-bis(beta-hydroxyethoxy)benzene, 2,2-bis(4-beta-hydroxyethoxyphenyl)propane, and bis(4-beta-hydroxyethoxyphenyl)sulfone.

In addition to the aforesaid aromatic dicarboxylic acid unit and the diol unit, the poly(alkylene terephthalate) may further contain a small amount of a polyfunctional compound. Specific examples of the polyfunctional compound unit include aromatic polybasic acids such as trimellitic acid, trimesic acid and 3,3',5,5'-tetracarboxydiphenyl, aliphatic polybasic acids such as butanetetracarboxylic acid, aromatic poyols such as phloroglucine and 1,2,4,5-tetrahydroxybenzene, aliphatic polyols such as glycerol, trimethylolethane, trimethylolpropane and pentaerythritol, and hydroxypolycarboxylic acids such as tartaric acid and malic acid.

The proportion of the terephthalic acid unit of the poly(alkylene terephthalate) is usually 50 to 100 mole %, preferably 70 to 100 mole %), and the proportion of the aromatic dicarboxylic acid unit other than the terephthalic acid unit is usually 0 to 50 mole %, preferably 0 to 30 mole %. The proportion of the ethylene gylcol unit is usually 50 to 100 mole %, preferably 70 to 100 mole %, and the proportion of the other diol unit is usually 0 to 50 mole %, preferably 0 to 30 mole %. The proportion of the polyfunctional compound unit is usually 0 to 2 mole %, preferably 0 to 1 mole %.

The poly(alkylene terephthalate) has an intrinsic viscosity [$72$], determined at 25° C. in a mixed solvent of phenol and tetrachloroethane in a weight ratio of 1:1, of usually 0.5 to 1.5 dl/g, preferably 0.6 to 1.2 dl/g, a melting point of usually 210° to 265° C., preferably 220° to 260° C., and a glass transition point of usually 50° to 120° C., preferably 60° to 100° C.

The laminates described above can be utilized in various applications because of their excellent melt-moldability, stretchabilty, mechanical strength, transparency and gas-barrier properties.

A stretched laminate composed of a layer of the copolyester of this invention and a layer of a poly(alkylene terephthalate) having ethylene terephthalate as a main structural unit will be described. The stretched laminate in accordance with this invention is formed by stretching the aforesaid laminate. The stretched laminate may be a monoaxially or biaxially stretched laminate which is in the form of a film, sheet, plate, etc. The stretch ratios of the stretched laminate may be the same as those described above for the stretched articles of the copolyester of the invention. The stretched laminates may be heat-set.

The stretched laminated structure of this invention is obtained by stretching a pre-molded article of the aforesaid laminate in the same way as in the stretching of the copolyester.

The stretched laminated structure of this invention can be utilized in many applications because of its excellent mechanical strength, transparency, gas-barrier properties, etc.

The preform in accordance with this invention for use in forming multilayer blow-molded articles is a preform of a laminated structure composed of a layer of the copolyester and a layer of the poly(alkylene terephthalate) layer having ethylene terephthalate as a main structural unit, or the laminated structures described above. The preform having a laminated structure may be in the form of the same two, three or four layer structure as described above with respect to the laminated structure of this invention. A stretched multilayer blow molded article formed from a two-layer preform composed of a layer of the copolyester and a layer of the poly(alkylene terephthalate), or a three-layer preform composed of an interlayer of the copolyester and outside layers of the poly(alkylene terephthalate) has excellent mechanical strength, transparency and gas-barrier property.

As required, suitable amounts of various additives conventionally used for polyesters, such as nucleating agents, inorganic fillers, lubricants, slip agents, antiblocking agents, stabilizers, antistatic agents, antihaze agents and pigments may be incorporated into the copolyester and the poly(alkylene terephthalate) constituting the preform in accordance with this invention.

The preform in accordance with this invention for preparation of a multilayer blow molded article is prepared by known conventional methods, for example, by molding a tubular article having the aforesaid laminated structure.

The stretched multilayer blow molded article of this invention is composed of a layer of the copolyester and a layer of the poly(alkylene terephthalate), and is produced by stretching and blow-molding the aforesaid preform. The stretched mutilayer blow-molded article may be of a two layer structure composed of a layer of the copolyester and a layer of the poly(alkylene terephthalate), a three-layer structure composed of layers of the copolyester and the poly(alkylene terephthalate) laminated alternately, or of a structure composed of four or more layers prepared by laminating layers of the copolyester and the poly(alkylene terephthalate) alternately. The blow-molded article may be monoaxially or biaxially stretched. Generally, biaxially stretched multilayer blow-molded articles are preferred because of their higher mechanical strength and gas-barrier property. The stretch ratios of the stretched multilayer blow-molded articles may be the same as those described above with respect to the copolyester of the invention.

The stretched multilayer blow-molded article is produced by stretching and blow-molding the preform described above. For example, the preform is stretched at the aforesaid temperature in the longitudinal direction and then blow-molding it to effect its transverse stretching (biaxially stretching blow-molding).

The stretched multilayer blow-molded article of this invention can be used in various applications because of its excellent mechanical strength, thermal stability, gas barrier property and transparency. Because of their particularly excellent gas-barrier property, biaxially stretched multilayer blow-molded containers as one form of the stretched multilayer hollow molded articles in accordance with this invention are suitable for holding seasonings, oils, beer, wines and liquors, cooling beverages such as cola, cider and juices, cosmetics, detergents, etc. Particularly, for holding beer and carbonated beverages, these containers may be made in a thin wall thickness, and can also prolong the period within which these drinks can be tasted well.

When the stretched article of the copolyester of the invention is a stretched film-like article, it can also be used for electrical insulation, or for preparation of magnetic tapes, photographic films and metal vapor-deposited films.

The following Examples and Comparative Examples illustrate the present invention more specifically.

In these examples, various properties were measured and determined as follows:

The intrinsic viscosity $[\eta]$ of the polyester was measured at 25° C. in a mixed solvent of phenol and tetrachloroethane in a weight ratio of 1:1.

The composition of the polyester was determined by decomposing it with n-butanol and analyzing the decomposition product by gas chromatography.

In the compositions of the copolyesters shown in the following examples, the remainder of the proportions of the aromatic dicarboxylic acid components, aromatic monohydroxy-monocarboxylic acid component, and ethylene glycol component shows the proportion of the diethylene glycol component.

The glass transition temperature of the polyester was measured by a differential scanning calorimeter.

With regard to the gas-barrier property of a sheet, stretched film or stretched bottle of the polyester, its oxygen gas permeability coefficient was measured by using an OXTRAN device made by Mocon Company, and its carbon dioxide gas permeability coefficient, by using a PERMATRAN C-IV device made by Mocon Company.

The thickness of a press sheet sample was 100 microns. The partial pressure of a gas on the test gas side of a diffusion cell was atmospheric pressure. The sample was dried at 55° C. under reduced pressure for 20 hours before measurement, and the temperature of the sample during measurement was 25° C.

EXAMPLE 1

An autoclave was charged with 299.0 g of isophthalic acid, 39.9 g of terephthalic acid, 49.7 g of p-hydroxybenzoic acid, 178.8 g of ethylene glycol, 0.86 g of 1,1,1-tris(hydroxymethyl)ethane and 0.214 g of a 20% aqueous solution of tetraethyl ammonium hydroxide, and they were reacted at 200° C. and 3 kg/cm$^2$ for about 2 hours and then at 240° C. for about 3.5 hours with stiring. The resulting water was evaporated out of the system. The pressure of the system was returned to normal atmospheric pressure, and 0.55 g of a 10% ethylene glycol solution of a mixture of dimethyl phosphate and monomethyl phosphate in a weight ratio of 5:5. The mixture was stirred for 15 minutes and then taken out from the autoclave. The reaction mixture (120 g) was transferred to a glass polymerization vessel, and 0.266 g of a 2:8 (by weight) mixture of germanium dioxide and a 20% aqueous solution of tetraethyl ammonium hydroxide was added to the system. The reaction mixture was reacted first at 230° to 250° C. for about 1 hour with stirring in a stream of nitrogen. Then, the mixture was heated to 275° C. over the course of about 1 hour, and the inside of the autoclave was reduced to a pressure of about 0.8 mmHg. Then, the reaction was carried out at 275° C. and about 0.8 to 0.5 mmHg. The resulting ethylene glycol was evaporated out of the reaction system. During the polycondensation reaction, the viscosity of the reaction product increased with the passage of time. The resulting polyester containing isophthalic acid, terephthalic acid, p-hydroxybenzoic acid and ethylene glycol as component units had an intrinsic viscosity of 0.84 dl/g. The proportions of he component units are shown in Table 1. It was found that the p-hydroxybenzoic acid component existed in the chain of the copolyester while mainly forming ester linkages and ether linkages.

The intrinsic viscosity and glass transition temperature of the copolyester and the carbon dioxide gas permeability coefficient of a press sheet of the copolyester are summarized in Table 1.

EXAMPLE 2

The procedure of Example 1 was repeated except that the amount of isophthalic acid was changed to 259.2 g, and the amount of terephthalic acid, to 79.7 g.

COMPARATIVE EXAMPLE 1

The procedure of Example 1 was repeated except that the amount of isophthalic acid was changed to 159.5 g, and the amount of terephthalic acid, to 179.4 g.

EXAMPLES 3 AND 4

The procedure of Example 1 was repeated except that the amount of 1,1,1-tris(hydroxymethyl)ethane was changed to 0.29 g (Example 3) or 5.73 g (Example 4).

EXAMPLES 5 TO 7

The procedure of Example 1 was repeated except that instead of 1,1,1-tris(hydroxymethyl)ethane, 0.97 g (Example 5) of 1,1,1-tris(hydroxymethyl)propane (Example 5), 0.66 g of glycerol (Example 6) or 1.51 g of trimellitic acid (Example 7) was used.

EXAMPLES 8 TO 11

The procedure of Example 5 was repeated except that instead of p-hydroxybenzoic acid, 49.7 g of salicylic acid (Example 8), 54.8 g of 3-methyl-4-hydroxybenzoic acid (Example 9), 54.8 g of p-hydroxyphenylacetic acid (Example 10) or 67.7 g of 6-hydroxy-2-naphthoic acid (Example 11) was used.

EXAMPLES 12 AND 13

The procedure of Example 5 was repeated except that at the time of feeding the monomers 95.1 g of 1,4-bis(2-hydroxyethoxy)benzene (Example 12) or 162.3 g of 4,4'-bis(2-hydroxyethoxyphenyl)sulfone (Example 13) was additionally fed.

EXAMPLES 14 AND 15

The procedure of Example 1 was repeated except that 0.54 g of a 10% ethylene glycol solution of tri-n-butylamine was used instead of the 20% aqueous solution of tetraethyl ammnonium hydroxide and 0.075 g of trimethyl phosphate was used instead of the 50:50 mixture of dimethyl phosphate and monomethyl phosphate (Example 14); or 0.29 g of a 10% ethylene glycol solution of triethylamine was used instead of the 20% ethylene glycol solution of tetraethyl ammonium hydroxide and 0.174 g of triphenyl phosphate was used instead of the 50:50 mixture of dimethyl phosphate and monomethyl phosphate (Example 15).

EXAMPLES 16 TO 18

The procedure of Example 1 was repeated except that instead of the 2:8 mixed solution of germanium dioxide and the 20% aqueous solution of tetraethyl ammonium hydroxide, 0.087 g of antimony trioxide (Example 16), 0.041 g of titanium tetrabutoxide (Example 17) or 0.032 g of titanium oxide (II) acetylacetonate (Example 18) was used.

The compositions, intrinsic viscosities, and glass transition points of the copolyesters obtained in Examples 2 to 18 and the carbon dioxide gas permeability coefficients of press sheets formed from these copolyesters are summarized in Table 1.

TABLE 1

| Example (Ex.) or Comparative Example (CEx.) | Composition of the copolyester (mole %) | | | | | | Proportion of the copolyester | Intrinsic viscosity [η] (dl/g) | Glass transition temperature Tg (°C.) | Carbon dioxide gas permeability coefficient (ml-mm/m² day-atm) |
|---|---|---|---|---|---|---|---|---|---|---|
| | Iso-phthalic acid | Tere-phthalic acid | Aromatic monohydroxy-monocarboxylic acid | | Polyfunctional compound | | Ethylene glycol | | | |
| | | | Type | Proportion | Type | Proportion | | | | |
| Ex. 1 | 37.9 | 5.2 | p-Hydroxy-benzoic acid | 6.9 | THME (*1) | 0.13 | 47.9 | 0.84 | 67 | 3.6 |
| Ex. 2 | 33.1 | 10.2 | p-Hydroxy-benzoic acid | 6.6 | THME (*1) | 0.14 | 48.0 | 0.84 | 69 | 4.7 |
| CEx. 1 | 20.4 | 22.9 | p-Hydroxy-benzoic acid | 6.7 | THME (*1) | 0.14 | 47.8 | 0.85 | 71 | 13 |
| Ex. 3 | 38.0 | 5.2 | p-Hydroxy-benzoic acid | 6.8 | THME (*1) | 0.05 | 47.8 | 0.73 | 67 | 3.6 |
| Ex. 4 | 37.7 | 5.1 | p-Hydroxy-benzoic acid | 7.2 | THME (*1) | 1.0 | 48.2 | 0.97 | 67 | 3.9 |
| Ex. 5 | 38.0 | 5.1 | p-Hydroxy-benzoic acid | 6.9 | THMP (*2) | 0.13 | 47.5 | 0.80 | 68 | 3.5 |
| Ex. 6 | 38.0 | 5.2 | p-Hydroxy-benzoic acid | 6.8 | Glycerol | 0.14 | 48.1 | 0.77 | 67 | 3.6 |
| Ex. 7 | 37.9 | 5.1 | p-Hydroxy-benzoic acid | 7.0 | Trimellitic acid | 0.15 | 47.7 | 0.82 | 68 | 3.4 |
| Ex. 8 | 38.8 | 5.2 | Salicylic acid | 6.0 | THMP (*2) | 0.13 | 46.8 | 0.72 | 63 | 3.8 |
| Ex. 9 | 38.0 | 5.0 | 3-Methyl-4-hydroxy-benzoic acid | 7.0 | THMP (*2) | 0.14 | 47.2 | 0.83 | 66 | 4.1 |
| Ex. 10 | 38.1 | 5.1 | p-Hydroxy-phenyl acetic acid | 6.8 | THMP (*2) | 0.14 | 47.6 | 0.66 | 66 | 4.4 |
| Ex. 11 | 37.6 | 5.0 | 6-Hydroxy-2-naphthoic acid | 7.4 | THMP (*2) | 0.14 | 47.1 | 0.79 | 71 | 3.3 |
| Ex. 12 (*3) | 38.3 | 5.0 | p-Hydroxy-benzoic acid | 6.8 | THMP (*2) | 0.13 | 38.1 (*3) | 0.82 | 68 | 3.9 |
| Ex. 13 (*4) | 38.2 | 5.1 | p-Hydroxy-benzoic acid | 6.6 | THMP (*2) | 0.13 | 37.7 (*4) | 0.75 | 86 | 4.7 |
| Ex. 14 | 38.4 | 5.2 | p-Hydroxy benzoic acid | 6.4 | THMP (*2) | 0.13 | 46.9 | 0.78 | 67 | 3.6 |
| Ex. 15 | 38.1 | 5.0 | p-Hydroxy benzoic acid | 6.9 | THMP (*2) | 0.14 | 47.2 | 0.77 | 68 | 3.6 |
| Ex. 16 | 37.9 | 5.1 | p-Hydroxy benzoic acid | 7.0 | THME | 0.13 | 46.6 | 0.83 | 68 | 3.9 |
| Ex. 17 | 38.4 | 5.2 | p-Hydroxy | 6.4 | THME | 0.13 | 47.4 | 0.78 | 67 | 3.5 |

TABLE 1-continued

| Example (Ex.) or Comparative Example (CEx.) | Composition of the copolyester (mole %) | | | | | | | Proportion of the copolyester | | |
|---|---|---|---|---|---|---|---|---|---|---|
| | Iso-phthalic acid | Tere-phthalic acid | Aromatic monohydroxy-monocarboxylic acid | | Polyfunctional compound | | Ethylene glycol | Intrinsic viscosity $[\eta]$ (dl/g) | Glass transition temperature Tg (°C.) | Carbon dioxide gas permeability coefficient (ml-mm/m$^2$ day-atm) |
| | | | Type | Proportion | Type | Proportion | | | | |
| Ex. 18 | 38.7 | 5.3 | p-Hydroxy benzoic acid | 6.1 | THME | 0.14 | 46.5 | 0.69 | 66 | 3.6 |

(*1) THME stands for 1,1,1-tris(hydroxymethyl)ethane.
(*2) THMP stands for 1,1,1-tris(hydroxymethyl)propane.
(*3) In this Example, the copolyester contained 9.6 mole % of 1,4-bis(2-hydroxyethoxy)benzene.
(*4) In this Example, the copolyester contained 9.9 mole % of 4,4′-bis(2-hydroxyethoxyphenyl)sulfone.

COMPARATIVE EXAMPLE 2

Poly(ethylene terephthalate) having an intrinsic viscosity of 0.79 dl/g was synthesized from terephthalic acid and ethylene glycol in a customary manner. A press sheet prepared from the poly(ethylene terephthalate) had a carbon dioxide permeability coefficient of 25 ml-mm/m$^2$-day-atm and an oxygen gas permeability coefficient of 4.5 ml-mm/m$^2$-day-atm.

EXAMPLE 19

A copolyester containing isophthalic acid, terephthalic acid, p-hydroxybenzoic acid and ethylene glycol as component units was prepared in the same way as in Example 1 except that 81.5 g of beta-hydroxyethyl beta-hydroxyethyoxybenzoate was used instead of p-hydroxybenzoic acid. The resulting copolyester had an intrinsic viscosity of 0.78 dl/g and a glass transition temperature of 67° C. The proportions of isophthalic acid, terephthalic acid, p-hydroxybenzoic acid, ethylene glycol and tris(hydroxymethyl)ethane units of the copolyester were 37.3, 4.9, 7.3, 48.0, and 0.13 mole %, respectively. The copolyester had a carbon dioxide gas permeability coefficient of 3.7 ml-mm/m$^2$-day-atm.

EXAMPLES 20 AND 21 AND COMPARATIVE EXAMPLE 3

Press sheets having a thickness of 200 microns were prepared respectively from the copolyesters obtained in Examples 1 and 8 and Comparative Example 2. The press sheets were each stretched simultaneously at a stretch ratio of 3:1 longitudinally and transversely at a temperature of about 75° to 95° C. to prepare biaxially stretched films of the copolyesters having an average thickness of 22 microns.

The carbon dioxide gas permeability coefficients of these biaxially stretched films are shown in Table 2.

TABLE 2

| Run | Copolyester | Carbon dioxide gas permeability coefficient of the biaxially stretched film (ml-mm/m$^2$-day-atm) |
|---|---|---|
| Example 20 | Copolyester of Example 1 | 2.8 |
| Example 21 | Copolyester of Example 8 | 3.3 |
| Comparative Example 3 | Copolyester of Comparative Example 2 | 16 |

EXAMPLE 22

The same copolyester as obtained in Example 1 was produced in large quantities from isophthalic acid, terephthalic acid, p-hydroxybenzoic acid, ethylene glycol and 1,1,1-tris(hydroxymethyl)ethane.

The copolyester was extruded at about 240° C. by an extruder equipped with a T-die. The extruded sheet having a thickness of about 200 microns was stretched by a biaxial stretching device at about 75° to 85° C. to 3 times in a longitudinal direction (parallel to the extruding direction) and then to 3 times in a transverse direction (perpendicular to the extruding direction) to form a biaxially stretched film having a thickness of about 22 microns. The resulting biaxially stretched film has a carbon dioxide gas permeability coefficient of 2.7 ml-mm/m$^2$-day-atm.

EXAMPLE 23

A press sheet having a thickness of 200 microns of the copolyester obtained in Example 1 was laid over a press sheet having a thickness of 200 microns of the poly(ethylene terephthalate) obtained in Comparative Example 2, and the assembly was press-formed to prepare a multilayer press sheet having a thickness of 200 microns. In the resulting multilayer press sheet the copolyester layer had good adhesion to the poly(ethylene terephthalate) layer. Furthermore, the multilayer press sheet was biaxially stretched simultaneously under the same conditions as in Example 20 to prepare a biaxially stretched film having an average thickness of 22 microns. The copolyester layer and the poly(ethylene terephthalate) layer each had a thickness of about 11 microns. This fact led to the confirmation that the copolyester layer and the poly(ethylene terephthalate) layer were both stretched uniformly. The adhesion between the copolyester layer and the poly(ethylene terephthalate) layer was good. The biaxially stretched film has a carbon dioxide permeability coefficient of 8.0 ml-mm/m2-day-atm.

EXAMPLE 24

Poly(ethylene terephthalate) (Mitsui PET J-025) was first injection-molded and then the copolyester obtained in Example 22 was then injection-molded to form a preform composed of a layer of the poly(ethylene terephthalate) and a layer of the copolyester each having a thickness of about 1.6 mm. The preform was then heated to 85° to 90° C. by means of an infrared heating device, and stretched to about 2.5 times longitudinally and to about 4.3 times transversely by a stretching blow-molding machine to form a stretched bottle having an inner capacity of about 1 liter composed of an about 150 micron-thick layer of the poly(ethylene terephthalate) or an about 150 micron-thick layer of the copolyester at the minimum wall thickness portion of the bottle. The stretched bottle had an oxygen gas permeability coefficient of 0.09 ml-mm/m$^2$-day-atm and a carbon dioxide permeability coefficient of 1.4 ml-mm/m$^2$-day-atm.

COMPARATIVE EXAMPLE 4

The same poly(ethylene terephthalate) as used in Example 24 was injection-molded to prepare a preform composed of the poly(ethylene terephthalate) layer having the same thickness as the preform used in Example 24 (about 3.2 mm). The preform was stretched and blow-molded in the same way as in Example 24 to prepare a stretched bottle having an inner capacity of about 1 liter and a minimum wall thickness of about 300 microns. The stretched bottle had an oxygen gas permeability coefficient of 1.10 ml-mm/m$^2$-day-atm and a carbon dioxide gas permeability coefficient of 4.0 ml-mm/m$^2$-day-atm.

EXAMPLE 25

The copolyester obtained in Example 22 was first injection-molded, and then poly(ethylene terephthalate) (Mitsui PET J-025) was injection-molded to prepare a preform composed of the poly(ethylene terephthalate) layer and the copolyester layer in the reverse sequence to that in Example 24. The preform was stretched and blow-molded in the same way as in Example 24 to prepare a stretched bottle having an inner capacity of about 1 liter and composed of an about 150 micron-thick copolyester layer or an about 150-micron poly(ethylene terephthalate) layer at its minimum wall thickness portion. The stretched bottle had an oxygen gas permeability coefficient of 0.09 ml-mm/m$^2$-day-atm and a carbon dioxide gas permeability coefficient of 1.4 ml-mm/m$^2$-day-atm.

EXAMPLE 26

Polyethylene terephthalate (Mitsui PET J-055, a trade name) was melted at 280° C. by an extruder having a screw diameter of 90 mm. Separately, the copolyester obtained in Example 22 was melted at 230° C. by an extruder having a screw diameter of 40 mm. The molten polymers were respectively fed into a two-kind three-layer pipe die (molding temperature 250° C.) and extruded into a three-layer pipe composed of poly(ethylene terephthalate)/copolyester/poly(ethylene terephthalate) (thickness 1.2/1.2/1.2 mm) at a molding pressure of 80 kg/cm$^2$-G. The extruded pipe was cooled with water at 10° C. to obtain a three-layer pipe having an outside diameter of 24.8 mm and a thickness of 3.6 mm. The pipe was cut out. One end of the cut pipe was heat-melted to process it into a bottom, and the other end was similarly heat-melted and processed into a mouth portion. Thus, a preform having a total length of 16.5 cm and a weight of about 50 g was obtained.

The preform was then stretched biaxially by a biaxial stretching blow-molding machine (LB01, produced by Corpoplast Company) to 2.5 times longitudinally and to 4 times transversely at a temperature of 115° C. The blowing pressure was 25 kg/cm$^2$, and the time spent for heating the preform was 15 seconds. As a result, a multi-layer container having an inner capacity of 1.5 liters and composed of poly(ethylene terephthalate)/copolyester/poly(ethylene terephthalate) each having a thickness of 120 microns was obtained. The multilayer container had an oxygen gas permeability coefficient of 0.14 ml-mm/m$^2$-day-atm, and a carbon dioxide gas permeability coefficient of 2.0 ml/day-bottle-atm.

Using the resulting multilayer container, the following strength test was conducted.

Water at 0° C. was filled into container samples. The samples were then let fall onto the ground from various heights, and the minimum height which caused breakage of the sample was determined. When the height was 2 meters or below, no breakage occurred, nor was there delamination of the layers of the container.

What is claimed is:

1. A laminated structure, in the stretched or non-stretched state, composed of a layer of a five-component copolyester composed of the following components (a) to (d) and having the following characteristics (e) and (f):
    (a) 25 to 45 mole %, based on the total moles of the components (a), (b), (c) and (d) of the copolyester, of two aromatic dicarboxylic acid components composed of 70 to 90 mole % of an isophthalic acid component and 30 to 10 mole % of an aromatic dicarboxylic acid compound other than the isophthalic acid component, each based on the total moles of the two aromatic dicarboxylic acid components,
    (b) 45 to 50 mole %, based on the total moles of the components (a), (b), (c) and (d) of the copolyester, of a diol component composed of 50 to 100 mole % of an ethylene glycol component and 0 to 50 mole % of a diol component other than the ethylene glycol component, each based on the total moles of the two diol components,
    (c) 2 to 55 mole %, based on the total moles of the components (a), (b), (c) and (d) of the copolyester, of an aromatic monohydroxy-monocarboxylic acid component having 7 to 12 carbon atoms, and
    (d) 0.01 to 2 mole %, based on the total moles of the components (a), (b), (c) and (d) of the copolyester, of a polyfunctional compound component having 3 to 15 carbon atoms and at least three functional groups selected from the class consisting of carboxyl and hydroxyl groups; and
    (e) an intrinic viscosity [$\eta$], determined at 25° C. in a mixed solvent of phenol and tetrachloroethane in a weight ratio of 1:1, of 0.5 to 1.5 dl/g, and
    (f) a glass transision temperature of 50° to 120° C. and a layer of poly(ethylene terephthalate) or a copolyester thereof having ethylene terephthalate as a main structural unit.

2. The laminated structure of claim 1 in the stretched state.

3. The laminated structure of claim 1 in the non-stretched state.

4. The laminated structure of claim 1 which comprises inner and outer layers of the five-component copolyester and an interlayer of the poly(ethylene terephthalate) or the copolyester thereof.

5. The laminated structure of claim 1 comprising inner and outer layers of the poly(ethyleneterephthalate) of the copolyester thereof and an interlayer of the five-component copolyester.

6. The laminated structure of claim 1 which is in the form of a multilayer blow-molded article.

* * * * *

UNITED STATES PATENT AND TRADEMARK OFFICE
CERTIFICATE OF CORRECTION

PATENT NO. : 4,622,268

DATED : November 11, 1986

INVENTOR(S) : Tadao Yatsu, et al.

It is certified that error appears in the above-identified patent and that said Letters Patent is hereby corrected as shown below:

IN THE CLAIMS

Claim 1, line 35, (column 18, line 49),
 delete "transision", insert --transition--.

Claim 5, line 3, (column 18, line 63),
 delete the first occurrence of
 "of", insert --or--.

Signed and Sealed this

Tenth Day of February, 1987

Attest:

DONALD J. QUIGG

*Attesting Officer*   *Commissioner of Patents and Trademarks*